United States Patent
Yabu et al.

(10) Patent No.: US 9,205,790 B2
(45) Date of Patent: Dec. 8, 2015

(54) AUTOMOBILE FIBER-REINFORCED RESIN MEMBER AND METHOD FOR PRODUCING AUTOMOBILE FIBER-REINFORCED RESIN MEMBER

(71) Applicant: HONDA MOTOR CO., LTD., Minato-Ku, Tokyo (JP)

(72) Inventors: Tomoya Yabu, Wako (JP); Shigeto Yasuhara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/366,429

(22) PCT Filed: Dec. 13, 2012

(86) PCT No.: PCT/JP2012/082352
§ 371 (c)(1),
(2) Date: Jun. 18, 2014

(87) PCT Pub. No.: WO2013/094515
PCT Pub. Date: Jun. 27, 2013

(65) Prior Publication Data
US 2015/0015006 A1    Jan. 15, 2015

(30) Foreign Application Priority Data
Dec. 20, 2011  (JP) .................................. 2011-277883

(51) Int. Cl.
*B60R 19/26* (2006.01)
*B60R 19/03* (2006.01)
(Continued)

(52) U.S. Cl.
CPC ................. *B60R 19/03* (2013.01); *B29C 43/34* (2013.01); *B29C 70/081* (2013.01);
(Continued)

(58) Field of Classification Search
CPC ........ B60R 19/04; B60R 19/023; B60R 19/03
USPC .......................................................... 293/120
See application file for complete search history.

(56) References Cited

U.S. PATENT DOCUMENTS

| 4,937,032 A | 6/1990 | Krone et al. |
| 4,941,701 A | 7/1990 | Loren |

(Continued)

FOREIGN PATENT DOCUMENTS

| DE | 69305594 T2 | 5/1997 |
| JP | S57-174153 U | 11/1982 |

(Continued)

OTHER PUBLICATIONS

Official Communications dated Jun. 11, 2015 in regards to corresponding European Application No. 12 85 8977.

*Primary Examiner* — Pinel Romain
(74) *Attorney, Agent, or Firm* — Carrier Blackman & Associates, P.C.; Joseph P. Carrier; Jeffrey T. Gedeon (57) ABSTRACT

A bumper beam formed of an automobile fiber-reinforced resin member integrally includes a main body part that has a squared U-shaped cross section opening in one direction and that has a bottom wall and a pair of side walls, and a rib that connects the bottom wall and the pair of side walls. The main body part reinforced with continuous fibers and the rib reinforced with a discontinuous fiber are press formed at the same time to prevent the cross section from collapsing by reinforcing the main body part having a squared U-shaped cross section. It is possible to use the discontinuous fiber to reinforce the rib, which is difficult to reinforce with the continuous fibers, while ensuring high strength by reinforcing the main body part with the continuous fibers, and to eliminate the necessity of separately molding and joining the main body part and the rib.

20 Claims, 7 Drawing Sheets (51) Int. Cl.
  *B60R 19/18* (2006.01)
  *B29C 70/34* (2006.01)
  *B29C 70/08* (2006.01)
  *B29C 43/34* (2006.01)
  *B60R 19/02* (2006.01)
  *B60R 19/04* (2006.01)
  *B29K 105/08* (2006.01)
  *B29K 105/12* (2006.01)

(52) U.S. Cl.
  CPC ............ *B29C 70/345* (2013.01); *B60R 19/023* (2013.01); *B60R 19/04* (2013.01); *B60R 19/18* (2013.01); *B29K 2105/08* (2013.01); *B29K 2105/12* (2013.01); *B60R 2019/1853* (2013.01)

(56) References Cited

U.S. PATENT DOCUMENTS

| | | | |
|---|---|---|---|
| 5,290,079 A * | 3/1994 | Syamal | ............ 293/120 |
| 5,507,540 A | 4/1996 | Pernot | |
| 5,794,403 A * | 8/1998 | Oberlander et al. | ....... 52/786.11 |
| 6,004,650 A * | 12/1999 | Schweizer et al. | ............ 428/107 |
| 7,341,076 B2 * | 3/2008 | Braekevelt et al. | ............ 139/50 |
| 2001/0054826 A1 | 12/2001 | Hirota | |
| 2012/0104775 A1 * | 5/2012 | Marur | ............ B60R 19/18 293/120 |
| 2012/0231252 A1 * | 9/2012 | Arakawa | ............ B32B 5/024 428/219 |
| 2012/0306222 A1 * | 12/2012 | Choi | ............ B60R 19/03 293/120 |
| 2014/0162020 A1 * | 6/2014 | Wang | ............ B32B 5/24 428/113 |

FOREIGN PATENT DOCUMENTS

| | | |
|---|---|---|
| JP | S64-6227 B2 | 2/1989 |
| JP | H01-197147 A | 8/1989 |
| JP | H02-84309 A | 3/1990 |
| JP | 02-92756 A | 4/1990 |
| JP | H03-52263 U | 5/1991 |
| JP | 06-39929 A | 2/1994 |
| JP | 08-52735 A | 2/1996 |
| JP | 3521485 B2 | 4/2004 |
| JP | 2005-263114 A | 9/2005 |

* cited by examiner

AUTOMOBILE FIBER-REINFORCED RESIN MEMBER AND METHOD FOR PRODUCING AUTOMOBILE FIBER-REINFORCED RESIN MEMBER

TECHNICAL FIELD

The present invention relates to an automobile fiber-reinforced resin member integrally including a main body part that has a squared U-shaped cross section opening in one direction and has a bottom wall and a pair of side walls, and a rib that connects the bottom wall and the pair of side walls, and a method for producing the automobile fiber-reinforced resin member.

BACKGROUND ART

An arrangement in which a rib is formed on a rear face of a bumper face fitted so as to cover a fiber-reinforced resin bumper beam (bumper reinforcement) is known from Patent Document 1 below.

Furthermore, a composite in which a rib of a fiber-reinforced resin containing randomly disposed discontinuous fibers is formed on a fiber-reinforced resin wall containing a continuous fiber woven cloth is known from Patent Document 2 below.

Moreover, an arrangement in which a fiber-reinforced resin product with a desired shape is obtained by press forming a stampable sheet in which a thermoplastic synthetic resin powder is mixed with discontinuous inorganic fibers using a mold is known from Patent Document 3 below.

RELATED ART DOCUMENTS

Patent Documents

Patent Document 1: Japanese Patent No. 3521485
Patent Document 2: Japanese Patent Application Laid-open No. 2-84309
Patent Document 3: Japanese Patent Publication No. 1-6227

SUMMARY OF THE INVENTION

Problems to be Solved by the Invention

In the arrangement described in Patent Document 1 above, the bumper beam is made of a fiber-reinforced resin, but since the rib formed integrally with the bumper face is made of polypropylene, the impact absorbing effect of the rib cannot be said to be sufficient.

Furthermore, the arrangement described in Patent Document 2 has the problem that, since it is necessary to mold a rib of a fiber-reinforced resin containing randomly disposed discontinuous fibers after a fiber-reinforced resin wall containing a continuous fiber woven cloth is molded, the number of production steps increases, thus causing an increase in cost.

Moreover, the arrangement described in Patent Document 3 has the problem that, since the fiber-reinforced resin product is reinforced only with discontinuous fibers, compared with one reinforced with continuous fibers the strength is poor.

The present invention has been accomplished in light of the above circumstances, and it is an object thereof to enhance the torsional rigidity of an automobile fiber-reinforced resin member having a squared U-shaped cross section and to simplify its production steps.

Means for Solving the Problems

In order to attain the above object, according to a first aspect of the present invention, there is provided an automobile fiber-reinforced resin member integrally comprising a main body part that has a squared U-shaped cross section opening in one direction and has a bottom wall and a pair of side walls, and a rib that connects the bottom wall and the pair of side walls, wherein the main body part, which is reinforced with continuous fibers, and the rib, which is reinforced with a discontinuous fiber, are press formed at the same time.

Further, according to a second aspect of the present invention, in addition to the first aspect, the continuous fibers are aligned in two directions that are perpendicular to each other and are plain woven.

Furthermore, according to a third aspect of the present invention, in addition to the second aspect, the directions in which the continuous fibers are aligned are along a direction of principal stress of the main body part and a direction that is perpendicular to said direction.

Moreover, according to a fourth aspect of the present invention, in addition to any one of the first to third aspects, the rib has a cutout in an intermediate part in a direction joining the pair of side walls.

Further, according to a fifth aspect of the present invention, in addition to any one of the first to fourth aspects, the rib has a lattice shape and a boss having a positioning hole is integrally molded at an intersection point of the lattice.

Furthermore, according to a sixth aspect of the present invention, in addition to any one of the first to fifth aspects, the discontinuous fiber has a length of 0.9 mm to 4.4 mm Moreover, according to a seventh aspect of the present invention, in addition to any one of the first to sixth aspects, the main body part comprises at opposite ends thereof an end bracket reinforced with the discontinuous fiber.

Further, according to an eighth aspect of the present invention, in addition to any one of the first to seventh aspects, the distance between the pair of side walls is larger in a middle part in a longitudinal direction of the main body part than in opposite end parts thereof.

Furthermore, according to a ninth aspect of the present invention, in addition to any one of the first to eighth aspects, there is provided a method for producing the automobile fiber-reinforced resin member, the method comprising a step of setting a first prepreg comprising the continuous fibers on a molding face of a female die for molding an outer surface of the main body part, a step of setting a second prepreg comprising the discontinuous fiber on the first prepreg, and a step of molding the automobile fiber-reinforced resin member by pressing the first prepreg and the second prepreg by means of the female die and a male die having a molding face for molding an inner surface of the main body part and a groove for molding the rib.

Effects of the Invention

In accordance with the first aspect of the present invention, the automobile fiber-reinforced resin member integrally includes the main body part that has a squared U-shaped cross section opening in one direction and that has the bottom wall and the pair of side walls, and the rib that connects the bottom wall and the pair of side walls. Since the main body part reinforced with the continuous fibers and the rib reinforced with the discontinuous fibers are press formed at the same time, it is possible to prevent the cross section from collapsing by reinforcing the main body part having a squared U-shaped cross section, which has low rigidity against torsional deformation, by means of the rib. Furthermore, not only is it possible to use the discontinuous fiber to reinforce the rib, which is difficult to reinforce with continuous fibers, while ensuring high strength by reinforcing the main body part with the continuous fibers, but it is also possible to eliminate the necessity of separately molding and joining the main body part and the rib, thus simplifying the production steps.

Moreover, in accordance with the second aspect of the present invention, since the continuous fibers for the main body part are aligned in two mutually perpendicular directions and plain-woven, it is possible, by enhancing the rigidity of the automobile fiber-reinforced resin member having the squared U-shaped cross section, to prevent the jaws of the main body part from opening.

Furthermore, in accordance with the third aspect of the present invention, since the direction of alignment of the continuous fibers for the main body part is along the principal stress direction, it is possible to enhance the bending stiffness of the main body part. Moreover, when the main body part having the squared U-shaped cross section deforms so that its jaws open, stress is generated in a direction perpendicular to the principal stress direction, but since the continuous fibers are also aligned in that direction, the rigidity against the jaws of the main body part opening can be enhanced at the same time.

Furthermore, in accordance with the fourth aspect of the present invention, since the rib has the cutout in the intermediate part in the direction joining the pair of side walls, it is possible to reduce the weight of the main body part.

Moreover, in accordance with the fifth aspect of the present invention, since the boss having the positioning hole is provided at the intersection point of the lattice-shaped rib, a positioning operation when joining the bumper beam and another component becomes easy. Furthermore, if the positioning hole were post-machined by drilling, the resin between the fibers would become detached to thus degrade the strength, but since the boss having the positioning hole is molded integrally with the automobile fiber-reinforced resin member, it is possible to prevent the strength from degrading.

Furthermore, in accordance with the sixth aspect of the present invention, the length of discontinuous fibers for the rib is 0.9 mm to 4.4 mm; if an attempt was made to inject discontinuous fibers with such a length together with a resin, there is a possibility that a nozzle would be blocked, but press forming enables the use of sufficiently long discontinuous fibers, thus enhancing the strength of the rib.

Moreover, in accordance with the seventh aspect of the present invention, since the main body part includes at the opposite ends the end brackets reinforced with the discontinuous fiber, it is easy to join the opposite ends of the main body part to another member.

Furthermore, in accordance with the eighth aspect of the present invention, since the distance between the pair of side walls of the main body part is larger for the middle part in the longitudinal direction of the main body part than for the opposite end parts, when another member collides with the main body part from the opening part side, it is possible to increase the probability of the other member engaging with the main body part, thus enhancing the impact-absorbing effect.

Moreover, in accordance with the ninth aspect of the present invention, since the first prepreg containing continuous fibers is set on the molding face of the female die for molding the outer face of the main body part, the second prepreg containing discontinuous fibers is set on the first prepreg, and the first prepreg and the second prepreg are pressed by means of the female die and the male die having the molding face for molding the inner surface of the main body part and the groove for molding the rib, thus molding the automobile fiber-reinforced resin member, it becomes possible to mold the main body part and the rib in one step, thus simplifying the production steps.

EXPLANATION OF REFERENCE NUMERALS AND SYMBOLS

21 Main body part
21a Bottom wall
21b Side wall
21c Side wall
22 Horizontal rib (rib)
23 Vertical rib (rib)
23a Cutout
24 Boss
24a Positioning hole
25 End bracket
27 Female die
28 Male die
29 First prepreg
30 Second prepreg
31a Continuous fiber
31b Continuous fiber
32 Discontinuous fiber Modes For Carrying Out The Invention A mode for carrying out the present invention is explained below by reference to FIG. 1 to FIG. 7.

First Embodiment

Figure 1:
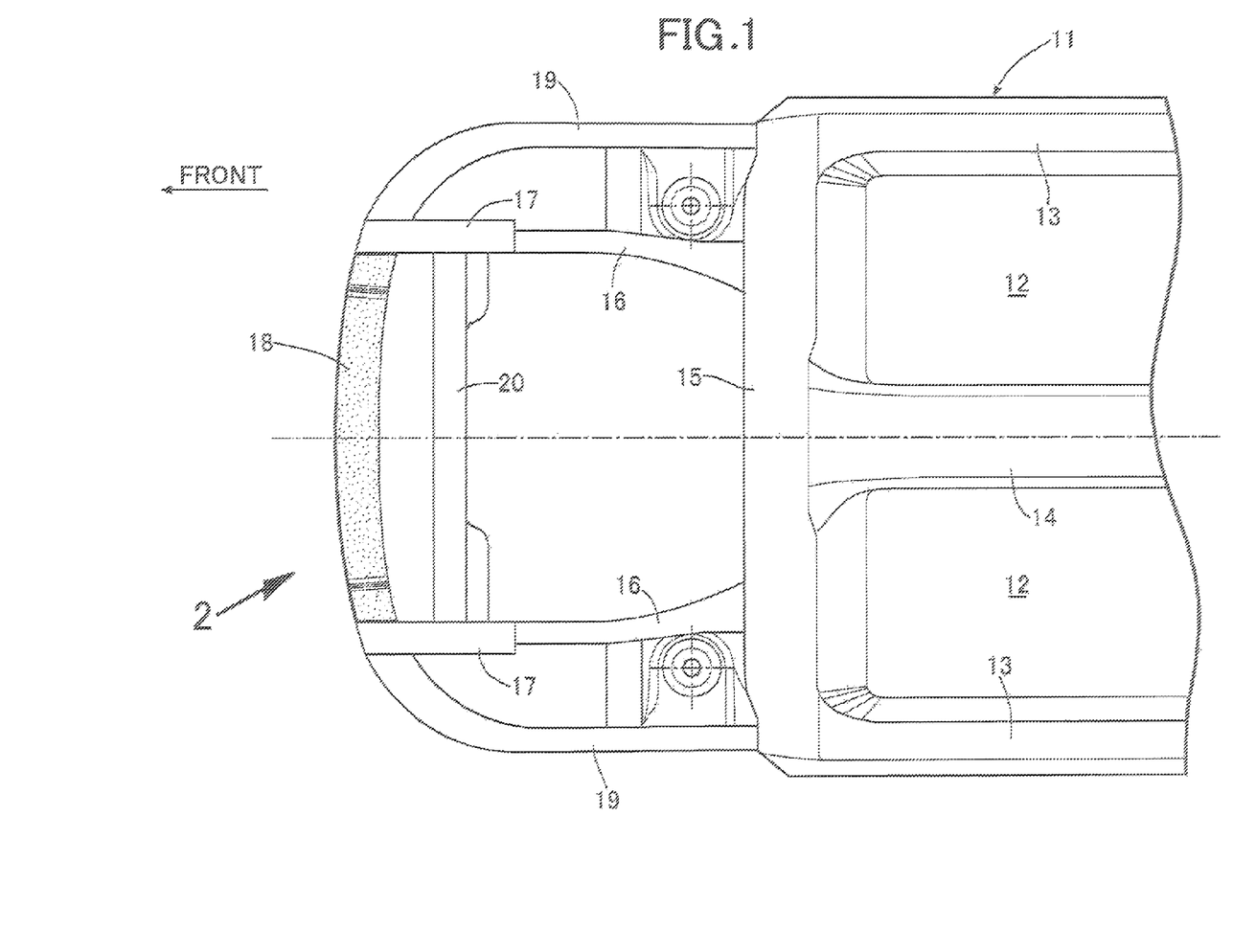
FIG. 1 is a plan view of a vehicle body front part of an automobile. (first embodiment)
Figure 2:
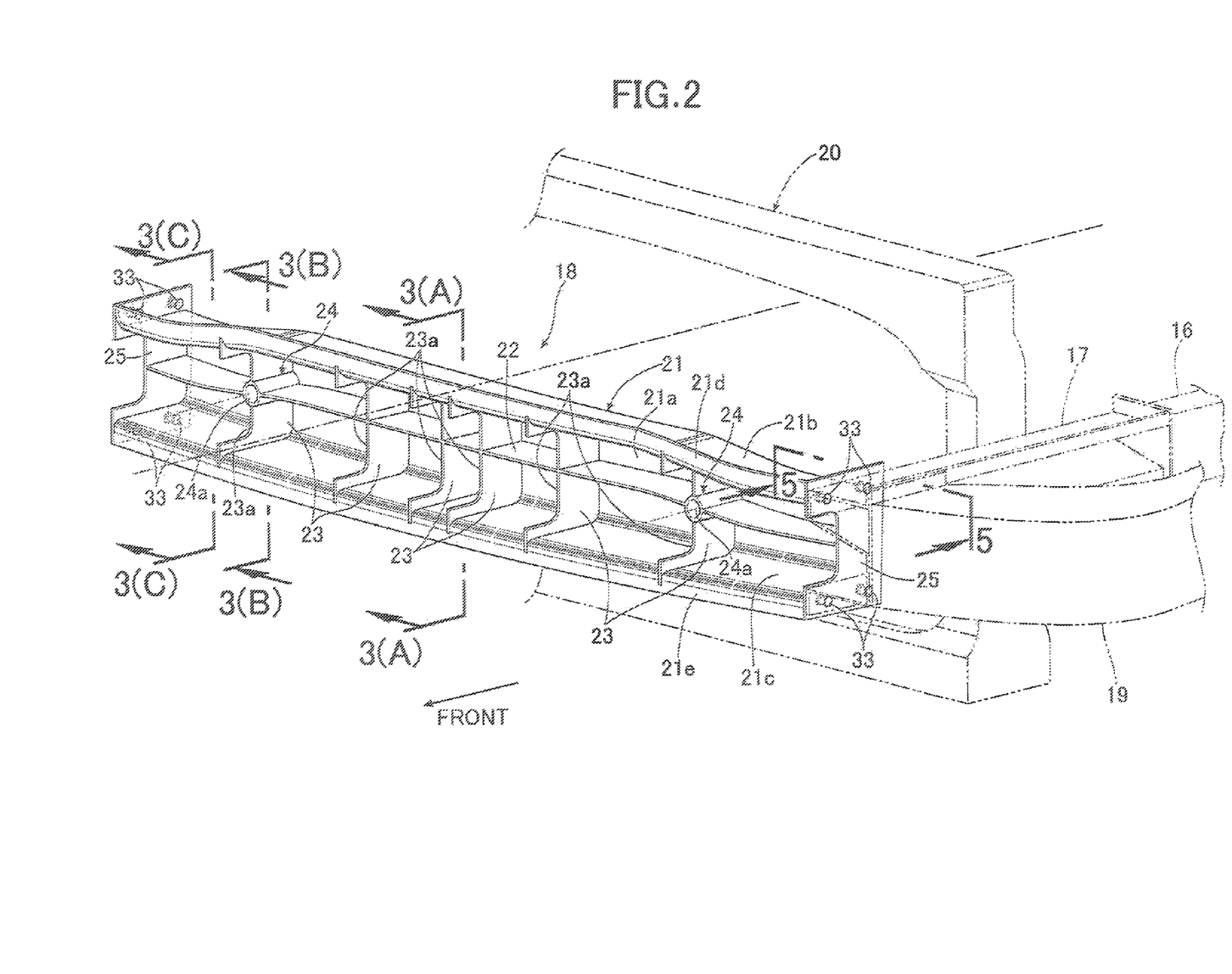
FIG. 2 is a view in the direction of arrow 2 in FIG. 1. (first embodiment)
Figure 3:
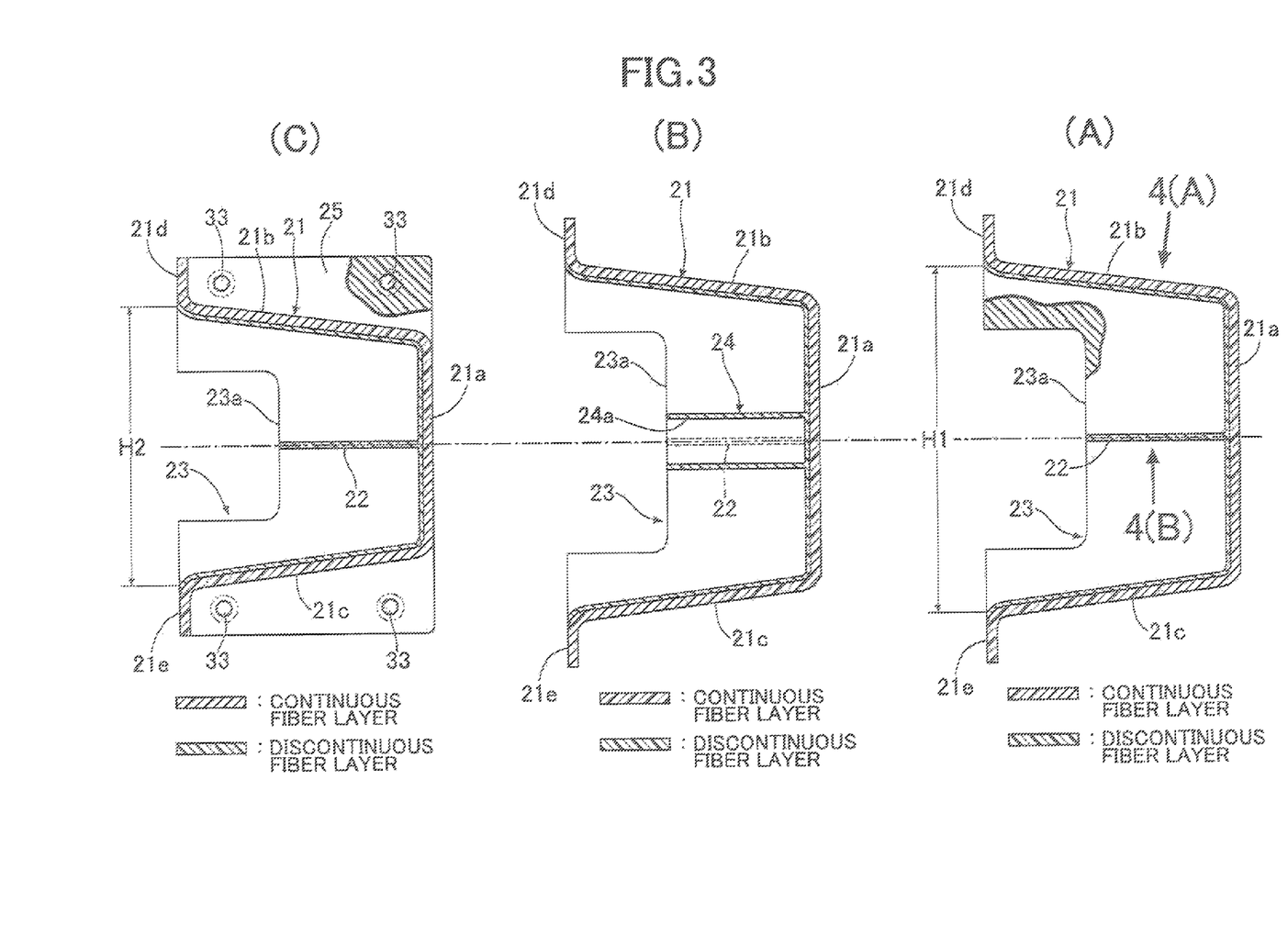
FIG. 3 shows sectional views along lines 3(A)-3(A), 3(B)-3(B), and 3(C)-3(C) in FIG. 2. (first embodiment)

As shown in FIG. 1 and FIG. 2, a cabin 11 made of a fiber-reinforced resin integrally includes a floor panel 12, a pair of left and right side sills 13 and 13, a center tunnel 14, a dashboard lower 15, etc. A pair of left and right front side frames 16 and 16 made of metal extend forwardly from the front end of the cabin 11, and a pair of left and right impact absorbing members 17 and 17, which are made of a fiber-reinforced resin, are connected to the front ends of the front side frames 16 and 16. Opposite end parts in the vehicle width direction of a bumper beam 18, which is made of a fiber-reinforced resin, are connected to inner faces of front end parts of the left and right impact absorbing members 17 and 17, and front end parts of a pair of left and right wheel house lower members 19 and 19, which are made of a fiber-reinforced resin, are connected to outer faces of the front end parts. A rectangular frame-shaped front bulkhead 20, which is made of a fiber-reinforced resin, is provided between the left and right impact absorbing members 17 and 17.

A main body part 21 of the bumper beam 18 is a member with a squared U-shaped cross section having an open front face and having a bottom wall 21a and a pair of side walls 21b and 21c. One horizontal rib 22 extending in the vehicle width direction and a plurality of vertical ribs 23 extending in the vertical direction so as to be perpendicular to the horizontal rib 22 are formed into a lattice shape on an inner face of the main body part 21. The rear edge of the horizontal rib 22 is connected to the bottom wall 21a, and the rear edges and upper and lower edges of the vertical ribs 23 are connected to the bottom wall 21a and the side walls 21b and 21c. A cutout 23a, indented into a squared U-shape, is formed at the front edge of each vertical rib 23. The gap between the upper and lower side walls 21b and 21b of the main body part 21 varies in the vehicle width direction; it is H1 in a middle part in the vehicle width direction and H2, which is smaller than H1, in opposite end parts in the vehicle width direction (see FIG. 3).

A flange 21d protrudes upwardly from the upper edge of the upper side wall 21b, and a flange 21e protrudes downwardly from the lower edge of the lower side wall 21c. Bosses 24 and 24 having positioning holes 24a and 24a are formed at positions where two vertical ribs 23 and 23 positioned at left and right ends intersect the horizontal rib 22. A pair of left and right plate-shaped end brackets 25 and 25, which are made of a fiber-reinforced resin, are provided at opposite ends in the vehicle width direction of the main body part 21.

Figure 6:
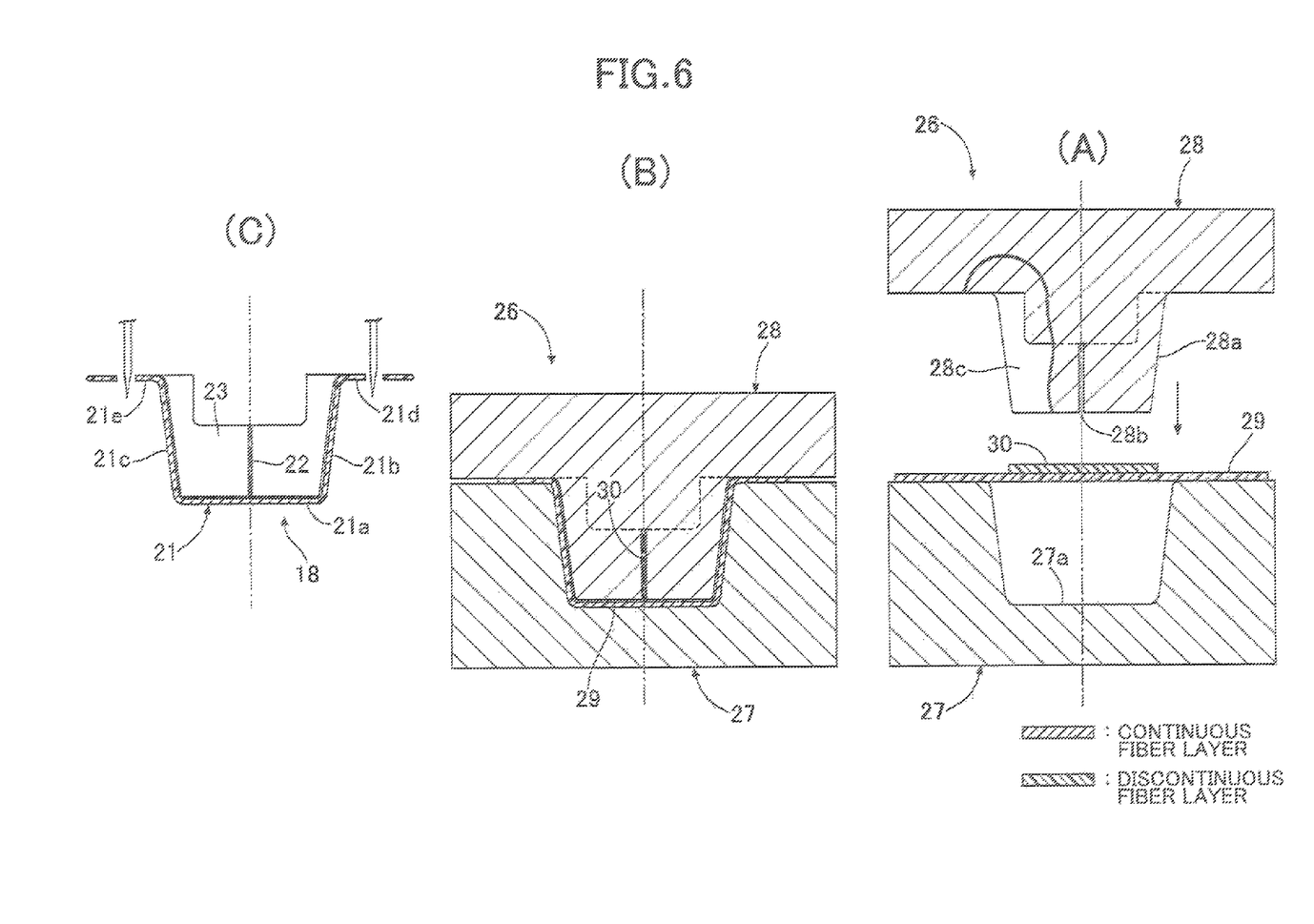
FIG. 6 is a diagram for explaining steps of molding a bumper beam. (first embodiment)

As shown in FIG. 6 (A), a mold 26 for press forming the bumper beam 18 includes a female die 27 having a recessed cavity 27a for molding an outer surface of the main body part 21 and a male die 28 having a projecting core 28a for molding an inner surface of the main body part 21, and a horizontal groove 28b for molding the horizontal rib 22 and vertical grooves 28c for molding the vertical ribs 23 are formed on the core 28a. In a state in which the mold 26 is opened, a first prepreg 29 of continuous fibers and a second prepreg 30 of discontinuous fibers are disposed in an upper part of the cavity 27a of the female die 27 in a preheated state. In the present embodiment, the length of discontinuous fibers of the second prepreg 30 is set at 0.9 mm to 4.4 mm The prepreg is formed by impregnating a woven cloth or UD (sheet in which continuous fibers are aligned in one direction) formed from a continuous fiber such as carbon fiber, glass fiber, or aramid fiber or a mat of discontinuous fibers as reinforcing material with a semi-cured thermosetting resin (epoxy resin, polyester resin, etc.) or a thermoplastic resin (nylon 6, polypropylene, etc.); its surface has no tackiness, but it has the flexibility to conform to the shape of a mold. In the case of a thermosetting resin, a plurality of sheets of prepreg are layered, inserted into a mold, and heated to for example on the order of 130° C. while applying pressure, and the thermosetting resin cures to thus give a fiber-reinforced resin product. In the case of a thermoplastic resin, a plurality of sheets of pre-heated prepreg are layered, inserted into a mold, molded under pressure, and then cooled, thus giving a fiber-reinforced resin product.

Subsequently, as shown in FIG. 6 (B), the male die 28 is lowered relative to the female die 27, and the first prepreg 29 is pressed by means of the cavity 27a of the female die 27 and the core 28a of the male die 28, thus molding the main body part 21 of the bumper beam 18 having a squared U-shaped cross section. In this process, since the second prepreg 30 containing discontinuous fiber as a reinforcing material is easily deformable, the second prepreg 30 sandwiched between the first prepreg 29 and the core 28a of the male die 28 flows into the horizontal groove 28b and vertical grooves 28c of the core 28a, thus molding the horizontal rib 22, the vertical ribs 23, and the end brackets 25 and 25 of the bumper beam 18 at the same time. Furthermore, part of the second prepreg 30 is layered as a thin film along the inner surface of the main body part 21.

Subsequently, as shown in FIG. 6 (C), the bumper beam 18 is completed by cutting off an excess part of the flanges 21d and 21e of the main body part 21 of the bumper beam 18 that has been taken out of the mold 26.

Figure 4:
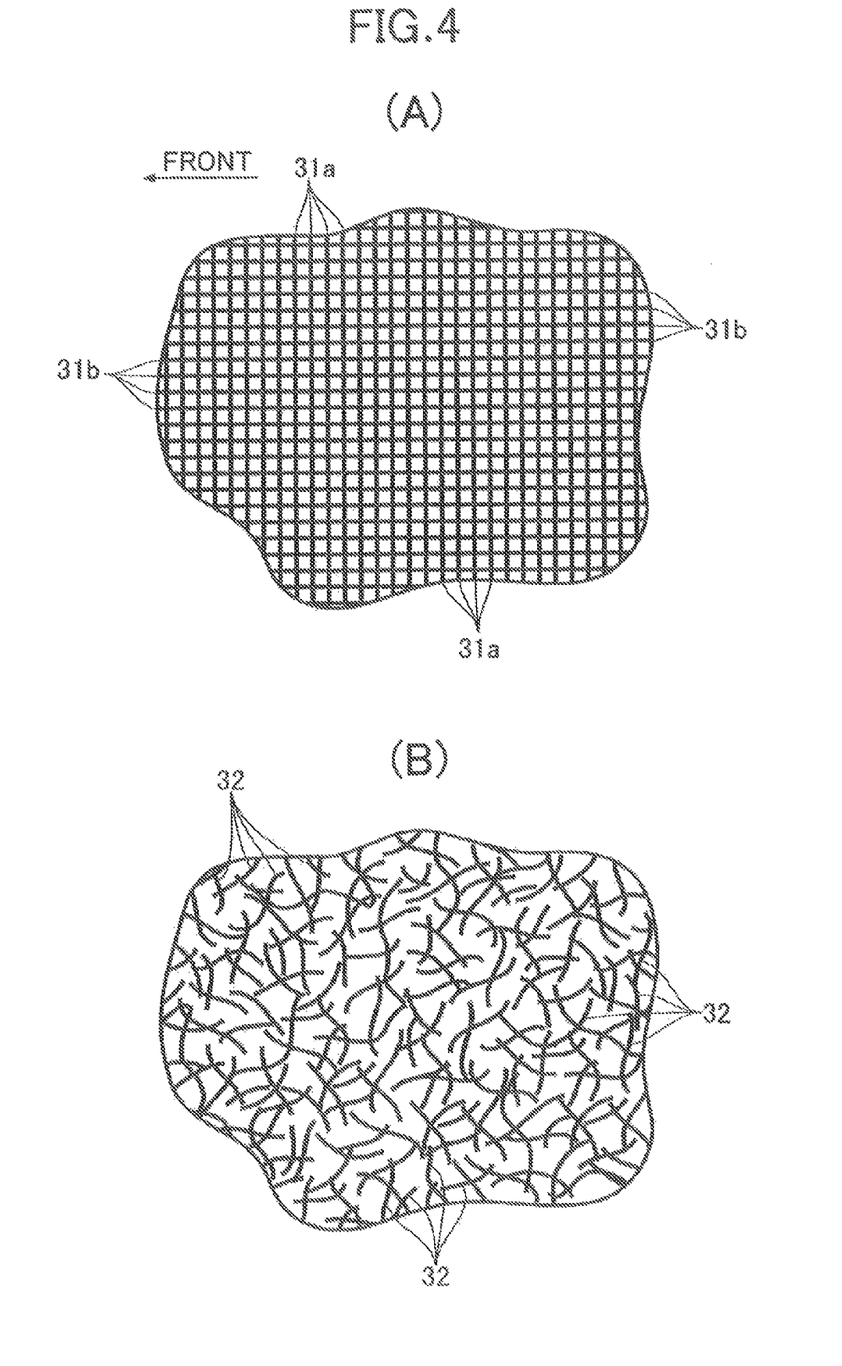
FIG. 4 shows enlarged views in the directions of arrows 4(A) and 4(B) in FIG. 3. (first embodiment)

Due to the first prepreg 29 and the second prepreg 30 being press formed by means of the mold 26 of FIG. 6, the main body part 21 of the bumper beam 18, that is the bottom wall 21a, the upper and lower side walls 21b and 21c, and the upper and lower flanges 21d and 21e are reinforced as shown in FIG. 4 with continuous carbon fibers 31a and 31b (see FIG. 4 (A)) plain woven so as to be aligned in two mutually perpendicular directions. The direction of alignment of one of the continuous fibers 31a is the vehicle width direction (that is, the principal stress direction of the bumper beam 18), and the direction of alignment of the other of the continuous fibers 31b is a direction that is perpendicular to the vehicle width direction. A thin layer covering inner faces of the horizontal rib 22, the vertical ribs 23, the bosses 24 and 24, and the end brackets 25 and 25 of the main body part 21 of the bumper beam 18 is reinforced with randomly tangled discontinuous carbon fibers 32 (see FIG. 4 (B)).

Figure 5:
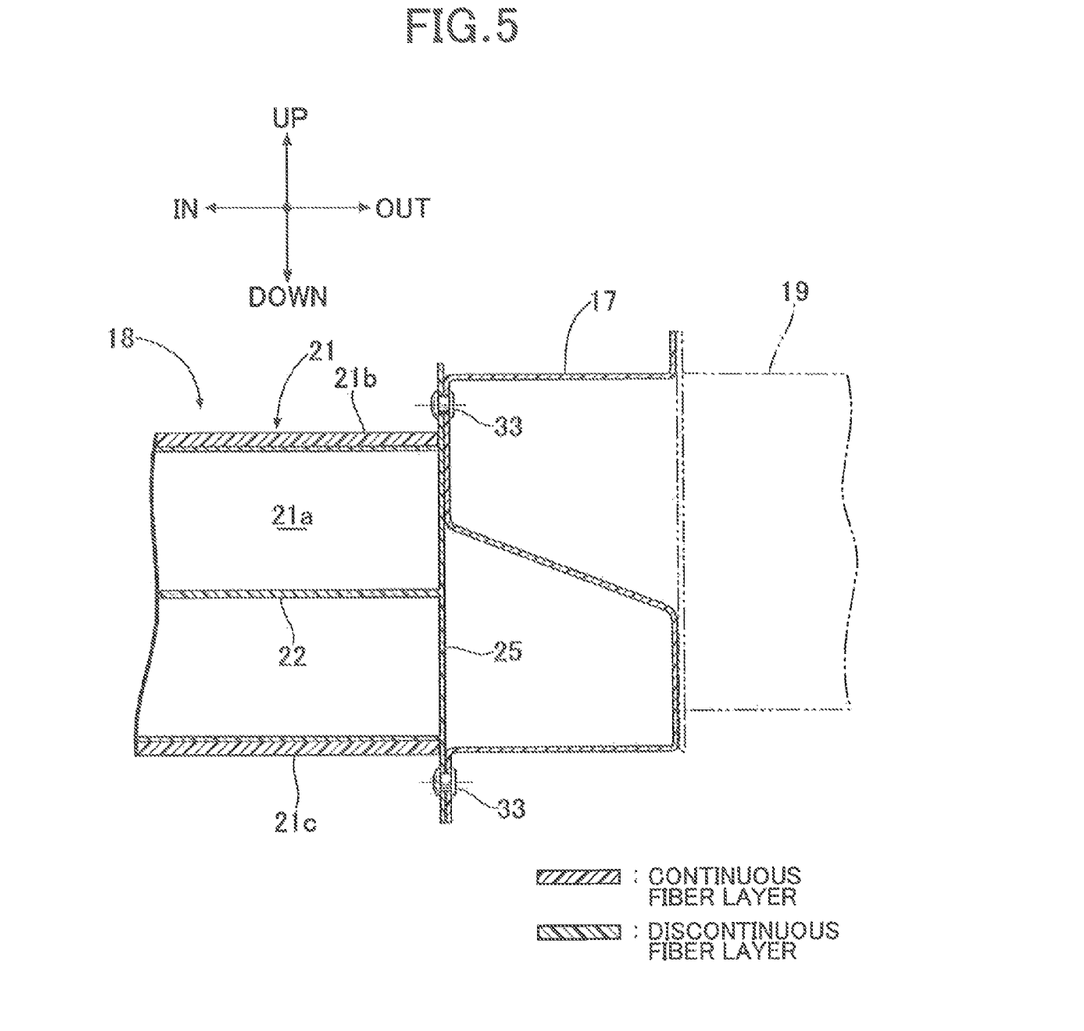
FIG. 5 is a sectional view along line 5-5 in FIG. 2. (first embodiment)

As shown in FIG. 5, the left and right impact absorbing members 17 and 17, which are made of a fiber-reinforced resin, have an S-shaped cross section when viewed from the front, and the left and right end brackets 25 and 25 are adhered or melt-bonded to the inner faces in the vehicle width direction of the left and right impact absorbing members 17 and 17 and further joined by means of rivets 33.

As described above, since the fiber-reinforced resin for the main body part 21 of the bumper beam 18 having a simple squared U-shaped cross section is reinforced with plain-woven continuous fibers having a high strength, and the fiber-reinforced resin for the horizontal rib 22, the vertical ribs 23, the bosses 24 and 24, and the end brackets 25 and 25, which have complicated shapes and are difficult to reinforce with plain-woven continuous fibers, is reinforced with the discontinuous fibers 32 having a high degree of freedom of molding, it is possible to achieve a balance between strength and moldability of the bumper beam 18. Moreover, since the first prepreg 29 containing continuous fibers and the second prepreg 30 containing discontinuous fibers are placed within one and the same mold 26 to thus mold the bumper beam 18 in one step, compared with a case in which they are molded separately and integrated by adhesion or melt bonding, it is possible to cut the production cost.

Figure 7:
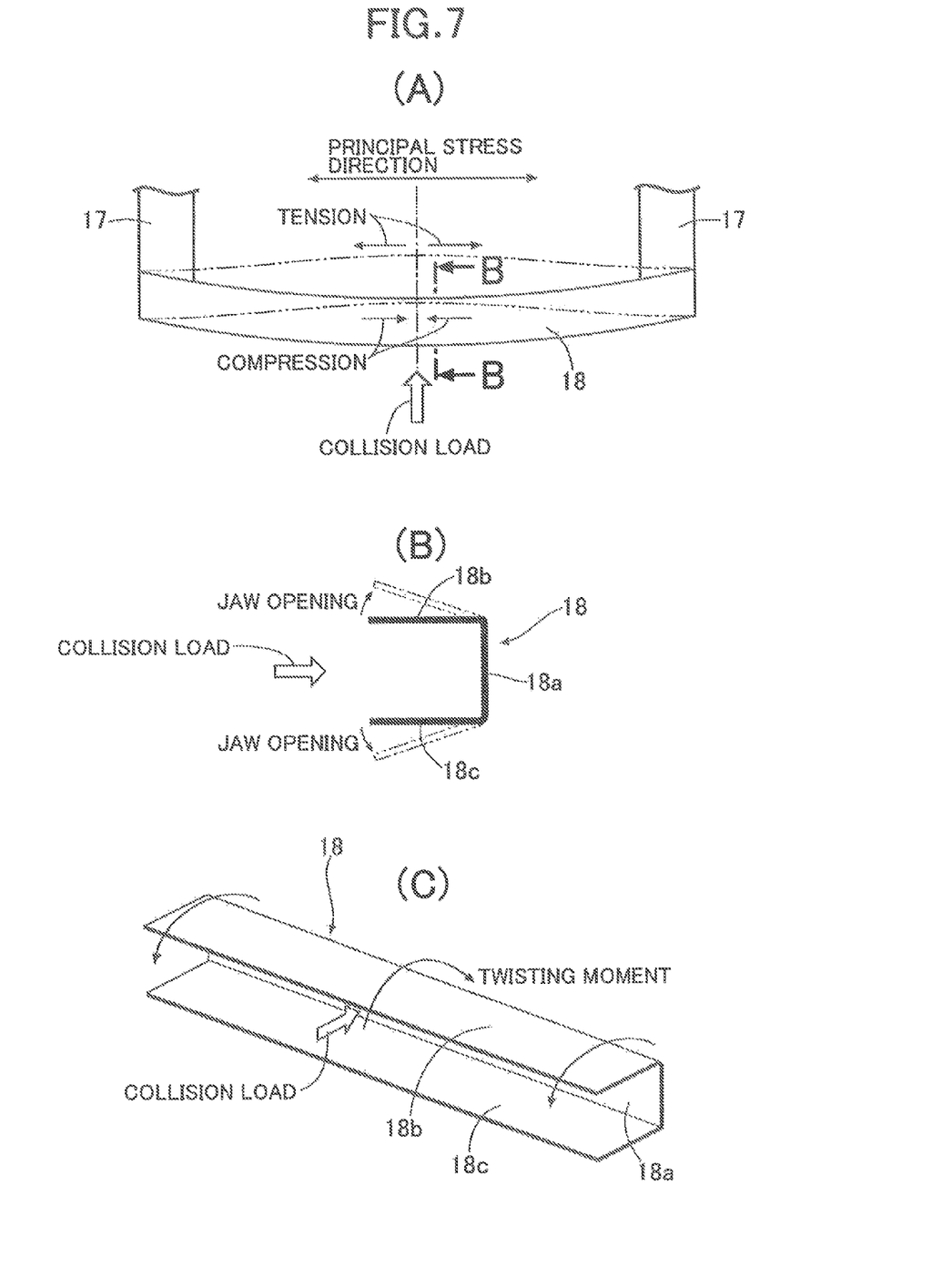
FIG. 7 is a diagram for explaining the operation when a collision load is inputted into a bumper beam. (first embodiment)

As shown in FIG. 7 (A), when the bumper beam 18 having a simple squared U-shaped cross section without ribs is involved in a frontal collision and deformed into a state denoted by the chain line, the bottom 21a is subjected to tensile stress, and front parts of the upper and lower side walls 21b and 21c, that is, the upper and lower flanges 21d and 21e are subjected to compression stress. Therefore, it is possible, by disposing the continuous fibers 31a, which are one of the mutually perpendicular continuous fibers, in the principal stress direction (vehicle width direction), to enhance the strength of the bumper beam 18 against bending deformation when involved in a frontal collision.

Furthermore, when the bumper beam 18 is involved in a frontal collision, since the upper and lower flanges 21d and 21e are deformed so that the jaws open as shown in FIG. 7 (B), tensile stress and compression stress also act in a direction perpendicular to the principal stress direction, but it is possible, by disposing the other of the continuous fibers 31b in that direction, to enhance the strength against the jaws of the bumper beam 18 opening.

As described above, in the case of the bumper beam 18 being involved in a frontal collision, high strength can be obtained by disposing the continuous fibers 31a and 31b in the vehicle width direction and the direction perpendicular thereto. However, when a collision load offset in the vertical direction is inputted into the bumper beam 18, the main body part 21 is subjected to torsional deformation as shown in FIG. 7 (C), and it is difficult to ensure rigidity against torsional deformation only by the reinforcement with continuous fibers 31a and 31b being disposed in mutually perpendicular directions. However, in accordance with the present embodiment, it is possible, by connecting the bottom portion 21a and the upper and lower side walls 21b and 21c of the main body part 21 of the bumper beam 18 by means of the horizontal rib 22 and the vertical ribs 23 in a lattice-shaped state, to sufficiently enhance the rigidity against torsional deformation without expensive reinforcement such as forming the bumper beam 18 with a closed cross-section or adding continuous fibers inclined at 45°.

Furthermore, the length of the discontinuous fibers for the horizontal rib 22 and the vertical ribs 23 is 0.9 mm to 4.4 mm; if an attempt was made to inject discontinuous fibers with such a length together with a resin, there is a possibility that a nozzle would be blocked, but press forming enables the use of sufficiently long discontinuous fibers, thus enhancing the strength of the horizontal rib 22 and the vertical ribs 23.

Moreover, since the bosses 24 and 24 having the positioning holes 24a and 24a are provided at the intersection points of the lattice-shaped horizontal rib 22 and vertical ribs 23, a positioning operation when joining the bumper beam 18 and another component becomes easy. Furthermore, since the main body part 21 includes at the opposite ends the end brackets 25 and 25 reinforced with the discontinuous fiber 32, it is easy to join the opposite ends of the main body part 21 to the wheel house lower members 19 and 19. Moreover, if the positioning holes 24a and 24a were post-machined by drilling, the resin between the fibers would become detached to thus degrade the strength, but since the bosses 24 and 24 having the positioning holes 24a and 24a are molded integrally with the bumper beam 18, it is possible to prevent the strength from degrading.

Furthermore, since the distance between the upper and lower side walls 21b and 21c of the main body part 21 is larger for the middle part in the longitudinal direction of the main body part 21 than for the opposite end parts, when another member collides with the main body part 21 from the opening side, it is possible to increase the probability of the other member engaging with the main body part 21, thus enhancing the impact-absorbing effect. Moreover, since the vertical ribs 23 have a cutout in an intermediate part in a direction joining the upper and lower side walls 21b and 21c, it is possible to reduce the weight of the main body part 21.

An embodiment of the present invention is explained above, but the present invention may be modified in a variety of ways as long as the modifications do not depart from the spirit and scope thereof.

For example, the automobile fiber-reinforced resin member of the present invention is not limited to the bumper beam 18 of the embodiment and may be a door beam or a reinforcing member.

The invention claimed is:

1. An automobile fiber-reinforced resin member integrally comprising a main body part that has a bottom wall and a pair of side walls and has a squared U-shaped cross section having an open face which is in front when involved in a frontal collision, a horizontal rib extending in a vehicle width direction and having a rear edge connected to a bottom wall, and a vertical rib extending in a vertical direction so as to be perpendicular to the horizontal rib and having a rear edge connected to the bottom wall and upper and lower edges connected to the pair of side walls, respectively, and the horizontal rib and the vertical rib being formed into a lattice shape, wherein
the main body part, which is reinforced with continuous fibers, and the horizontal rib and the vertical rib, which are reinforced with a discontinuous fiber, are press formed at the same time, and
wherein the rib has a cutout in an intermediate part in a direction joining the pair of side walls.

2. The automobile fiber-reinforced resin member according to claim 1, wherein the continuous fibers are aligned in two directions that are perpendicular to each other and are plain woven.

3. The automobile fiber-reinforced resin member according to claim 2, wherein the directions in which the continuous fibers are aligned are along a direction of principal stress of the main body part and a direction that is perpendicular to said direction.

4. The automobile fiber-reinforced resin member according to claim 3, wherein the rib has a cutout in an intermediate part in a direction joining the pair of side walls.

5. The automobile fiber-reinforced resin member according to claim 3, wherein the rib has a lattice shape and a boss having a positioning hole is integrally molded at an intersection point of the lattice.

6. The automobile fiber-reinforced resin member according to claim 3, wherein the discontinuous fiber has a length of 0.9 mm to 4.4 mm.

7. The automobile fiber-reinforced resin member according to claim 3, wherein the main body part comprises at opposite ends thereof an end bracket reinforced with the discontinuous fiber.

8. The automobile fiber-reinforced resin member according to claim 3, wherein the distance between the pair of side walls is larger in a middle part in a longitudinal direction of the main body part than in opposite end parts thereof.

9. The automobile fiber-reinforced resin member according to claim 2, wherein the rib has a cutout in an intermediate part in a direction joining the pair of side walls.

10. The automobile fiber-reinforced resin member according to claim 2, wherein the rib has a lattice shape and a boss having a positioning hole is integrally molded at an intersection point of the lattice.

11. The automobile fiber-reinforced resin member according to claim 2, wherein the discontinuous fiber has a length of 0.9 mm to 4.4 mm.

12. The automobile fiber-reinforced resin member according to claim 2, wherein the main body part comprises at opposite ends thereof an end bracket reinforced with the discontinuous fiber.

13. The automobile fiber-reinforced resin member according to claim 2, wherein the distance between the pair of side walls is larger in a middle part in a longitudinal direction of the main body part than in opposite end parts thereof.

14. The automobile fiber-reinforced resin member according to claim 2, wherein the pair of side walls comprise an upper side wall and a lower side wall, and a flange protrudes upwardly from an upper edge of the upper side wall and a flange protrudes downwardly from a lower edge of the lower side wall.

15. The automobile fiber-reinforced resin member according to claim 1, wherein the rib has a lattice shape and a boss having a positioning hole is integrally molded at an intersection point of the lattice.

16. The automobile fiber-reinforced resin member according to claim 1, wherein the discontinuous fiber has a length of 0.9 mm to 4.4 mm.

17. The automobile fiber-reinforced resin member according to claim 1, wherein the main body part comprises at opposite ends thereof an end bracket reinforced with the discontinuous fiber.

18. The automobile fiber-reinforced resin member according to claim 1, wherein the distance between the pair of side walls is larger in a middle part in a longitudinal direction of the main body part than in opposite end parts thereof.

19. The automobile fiber-reinforced resin member according to claim 1, wherein the pair of side walls comprise an upper side wall and a lower side wall, and a flange protrudes upwardly from an upper edge of the upper side wall and a flange protrudes downwardly from a lower edge of the lower side wall.

20. A method for producing an automobile bumper beam made of a fiber-reinforced resin member, wherein the automobile bumper beam comprises:

a main body part that has a bottom wall and a pair of side walls and has a squared U-shaped cross section having an open face; and a vertical rib extending in a vertical direction and having a rear edge connected to the bottom wall and upper and lower edges connected to the pair of side walls, respectively, wherein the main body part is reinforced with continuous fibers, and the vertical rib is reinforced with a discontinuous fiber and has a cutout in an intermediate part in a direction joining the pair of side walls, the method comprising:

a step of setting a first prepreg comprising the continuous fibers on a molding face of a female die for molding an outer surface of the main body part;

a step of setting a second prepreg comprising the discontinuous fiber on the first prepreg; and a step of molding the automobile bumper beam by pressing the first prepreg and the second prepreg at the same time by means of the female die and a male die having a molding face for molding an inner surface of the main body part made of the continuous fibers and a groove for molding the vertical rib made of the discontinuous fiber.

* * * * *